United States Patent
Robinson et al.

(10) Patent No.: US 7,606,168 B2
(45) Date of Patent: Oct. 20, 2009

(54) APPARATUS AND METHOD FOR MESSAGE-CENTRIC ANALYSIS AND MULTI-ASPECT VIEWING USING SOCIAL NETWORKS

(75) Inventors: Eric M. Robinson, Bellevue, WA (US); Edward L. Walter, Bainbridge Island, WA (US)

(73) Assignee: Attenex Corporation, Seattle, WA (US)

(*) Notice: Subject to any disclaimer, the term of this patent is extended or adjusted under 35 U.S.C. 154(b) by 918 days.

(21) Appl. No.: 11/045,775

(22) Filed: Jan. 28, 2005

(65) Prior Publication Data
US 2006/0173957 A1 Aug. 3, 2006

(51) Int. Cl.
*H04L 12/28* (2006.01)
(52) U.S. Cl. .................. 370/254; 707/102
(58) Field of Classification Search ............. 370/412; 705/1; 707/7, 101, 102, 103 R, 201, 205
See application file for complete search history.

(56) References Cited

U.S. PATENT DOCUMENTS

| | | | |
|---|---|---|---|
| 6,778,995 B1 | 8/2004 | Gallivan | |
| 6,820,081 B1 | 11/2004 | Kawai et al. | |
| 7,359,894 B1* | 4/2008 | Liebman et al. | 707/3 |
| 2004/0148275 A1* | 7/2004 | Achlioptas | 707/3 |
| 2006/0021009 A1* | 1/2006 | Lunt | 726/4 |

* cited by examiner

*Primary Examiner*—Chirag G Shah
*Assistant Examiner*—Yong Zhou
(74) *Attorney, Agent, or Firm*—Patrick J. S. Inouye; Krista A. Wittman (57) ABSTRACT

Electronic data files are broadly characterized as "messages" and a social network is constructed by analyzing one or more messages exchanged between various entities. Additionally, messages from structured and/or unstructured data stores are correlated using one or more common/related data elements from two or more messages. Further, the social network and the concepts contained in the exchanged messages (i.e. semantic network) can be visualized using a series of multi-aspect viewing tools. Finally, in conjunction with the social network and the semantic network, a message network based on the chronological relationship of the messages (event network) can be constructed to analyze and visualize how the messages relate to each other in a time-based reference model. Once visualized, the relationship of the concepts contained in the messages as well as the relationship between the entities and the timing involved in the exchange of messages can be analyzed for desired information.

8 Claims, 9 Drawing Sheets

APPARATUS AND METHOD FOR MESSAGE-CENTRIC ANALYSIS AND MULTI-ASPECT VIEWING USING SOCIAL NETWORKS

TECHNICAL FIELD

The present invention is related in general to the field of computerized data and more specifically to the field of searching and sorting computerized data stores for information retrieval and analysis purposes.

BACKGROUND OF THE INVENTION

Most businesses, governments, entities and individuals rely heavily on computers for tasks such as word processing, e-mails, and various data-driven applications. With the ever increasing accumulation of electronic data files stored on computer systems everywhere, individuals and entities are faced with the daunting task of locating, extracting and analyzing the vast amounts of electronic data for various important and, in some case, critical tasks.

While various systems and tools exist today for searching computer-based data files, there are certain limitations in the existing products and procedures. For example, many existing tools are directed towards visualizing semantic network relationships between the concepts found in unstructured documents such as emails, word documents, spread sheets, PowerPoint presentations, text in CAD drawings, and the like. These tools are generally known as "text-mining" tools and can be used to analyze various unstructured documents by extracting common concepts and terms from the various documents.

These tools are typically used to acquire and analyze electronic documents by preparing an extensive database of the captured documents and the various indices that track the terms, concepts and metadata associated with these documents (From, To, CC, BCC, date created, subject, title, author etc). Then, other tools can be used to visualize the relationships, if any, which exist between those documents by providing an overview of the relationships based on the semantic content of the documents. Additionally, there are other tools that provide methods for investigating and analyzing the details of the relationships between the documents as well as the associated content. Similarly, other tools in widespread use today are capable of various traditional data-mining activities and can be used to analyze structured data such as databases, spreadsheets and the like.

While these various tools have been useful for certain limited data analysis purposes, there are certain circumstances where these tools are not sufficient. Even though it may be desirable to analyze the relationships that exist between documents that exist in both unstructured data stores as well as structured data stores, this task can be difficult if not impossible to achieve. For example, even though e-mail messages and various financial transactions (e.g., checks, a wire transfer between banks, an A/P or A/R entry) can all be generalized as "documents," there is presently no convenient or efficient way to correlate and/or analyze these disparate documents. The limitations of the present technology include, but are not limited to, the lack of a standardized central message store, the lack of a process or procedure to identify a given individual or entity given the many different names, aliases, e-mail accounts, bank and brokerage accounts, etc. that exist for each represented individual or entity, and the like.

Furthermore, even if the disparate documents can be related in some fashion, much of the information, primarily the content, associated with a given message or group of documents is unstructured or semi-structured and there are no convenient tools available to perform any meaningful analysis using this information. Additionally, retrieval of the targeted information is usually limited to the use of Boolean logic queries against the structured information and the associated simple terms even when access to the unstructured information is provided. Finally, when using the analytical tools presently available, the typical data visualization technology is generally limited to the presentation of "lists of lists of lists," typically presented in some type of tabular format. This is hardly a convenient, efficient, or effective way of analyzing complex concepts, particularly regarding the structure of the relationships between dozens, hundreds, thousands, or even millions of documents. Accordingly, even with a significant amount of time and effort expended, it is not always easy or even possible to locate, extract, correlate and/or analyze the desired data, even if it does exist.

As can be seen by the discussion presented above, there are many limitations inherent in the present systems and tools for searching and analyzing the electronic data files presently stored in various computer systems. Accordingly, without the development of new and useful methods and tools to perform additional document analytics and visualizations on both structured and unstructured information, the ability of users to extract the desired data for effective and efficient decision-making purposes will continue to be suboptimal.

SUMMARY OF THE INVENTION

The present invention provides an apparatus and method for message-centric data correlation, analysis and multi-aspect viewing of electronic data from both structured and unstructured data stores. In the present invention, all electronic data files are characterized as "messages" and messages from structured, unstructured, and semi-structured data stores are correlated by creating a social network relative to the exchange of messages and then using one or more common/related data elements from two or more messages to further explore and/or analyze the contents of the messages and the relationship between both the messages and the entities that exchanged the messages. Additionally, in certain preferred embodiments of the present invention, the correlated messages can be visualized using a series of multi-aspect viewing tools to visually analyze the relationship of the entities that exchanged the messages as well as relationship between the content contained in the related messages in the context of the social network.

Still other embodiments of the present invention will become readily apparent to those skilled in the art from the following detailed description wherein various embodiments of the present invention are described by way of illustrating the best mode contemplated for carrying out the invention. As will be realized, the invention is capable of other and different embodiments and its several details are capable of modifications in various respects, all without departing from the spirit and the scope of the present invention. Accordingly, the drawings and detailed description are to be regarded as illustrative in nature and not as restrictive.

BRIEF DESCRIPTION OF THE DRAWINGS

The preferred embodiments of the present invention will hereinafter be described in conjunction with the appended drawings, wherein like designations denote like elements, and.

DETAILED DESCRIPTION

As opposed to the traditional hierarchical organization chart, social network analysis involves the mapping and measuring of the sometimes less obvious relationships, interactions and transactions that exist between people and organizations, thereby providing an alternative view of an organization or group of people and can be used to understand the flow of communication between communicants.

The apparatus and methods of the present invention provide for the combination and extension of the existing tools for semantic network analysis of documents into the context of social network analysis and event analysis (i.e., how messages occur in time). In the process of providing additional tools and methodologies for document analytics, the lines between traditional data mining (structured data analysis) and text mining (unstructured data analysis) are blurred if not completely removed.

It is anticipated that the various preferred embodiments of the present invention will be useful in areas such as fraud analysis, forensic accounting, Sarbanes Oxley analysis, and due diligence for mergers and acquisitions. In addition to these markets the various preferred embodiments of the present invention may also be applicable to personal productivity tools like Microsoft Outlook/Exchange and Lotus Notes and to market segments like Insurance Fraud, Insurance Policy Due Diligence, Business Intelligence, Knowledge Management, Document Management, and Customer Relationship Management.

For the purposes of describing the present invention, electronic data files transmitted or shared by any two or more entities are hereinafter described as "messages" where each message may be generally characterized by at least the following elements: sender; receiver; action request; and content. Additionally, chronological elements such as date and time are frequently present. Other message characteristics may include various data elements associated with a given message such as routing history and timing, etc.

Figure 1:
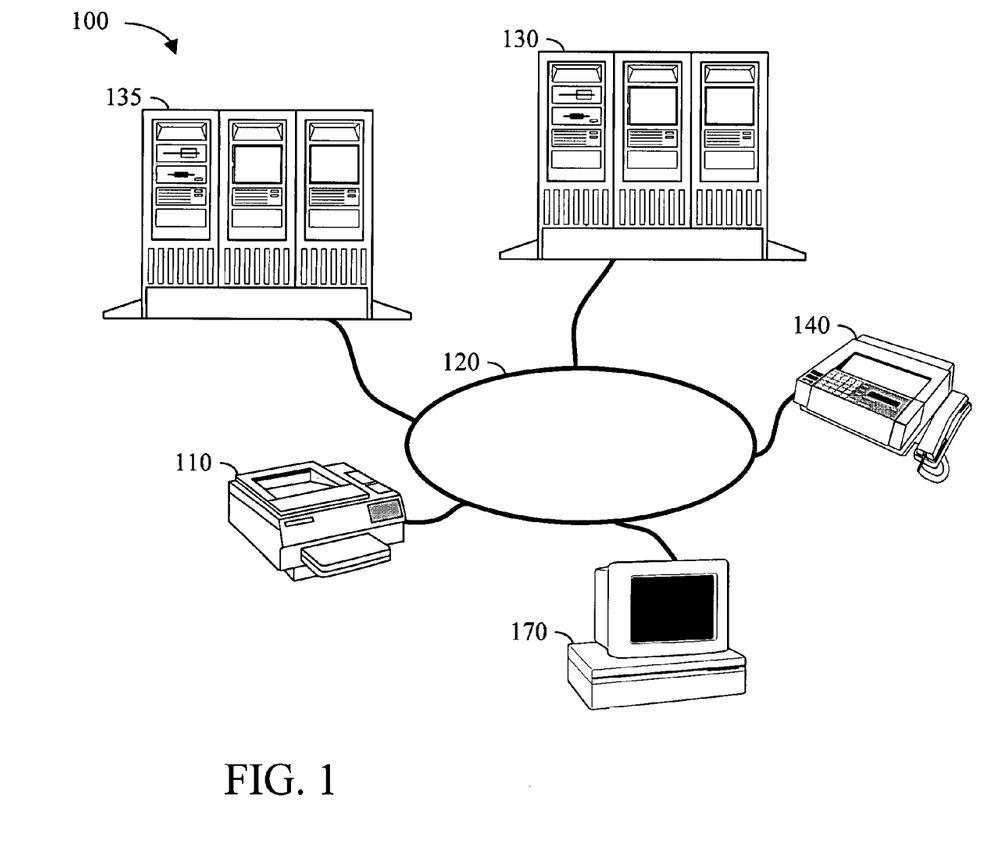
FIG. 1 is a block diagram of a computer-based system for correlating, analyzing, and viewing message-centric data based on a social network and in accordance with a preferred embodiment of the present invention.

Referring now to FIG. 1, a computer-based system 100 for implementing various preferred embodiments of the present invention includes: data store 130, data store 135, and computer 170, all connected or coupled to each other via a network 120. Additionally, an optional printer 110 and an optional fax machine 140 are included in system 100. Taken together, system 100 provides a way for various persons such as consultants, forensic accountants, lawyers, government regulators, investigators, and the like to more efficiently and effectively investigate and analyze various types of message communications and the associated relationships that exist between various parties as described herein in conjunction with the preferred embodiments of the present invention.

Data stores 130 and 135 represent message collections stored in relatively powerful computers that are made available to computer 170 via network 120. Various hardware components (not shown this FIG.) such as external monitors, keyboards, mice, tablets, hard disk drives, recordable CD-ROM/DVD drives, jukeboxes, fax servers, magnetic tape drives, and other devices known to those skilled in the art may be used in conjunction with the computers housing data stores 130 and 135. The computers hosting data stores 130 and 135 may also include various software components (not shown this FIG.) such as application servers, database servers, web servers, firewalls, security software, and the like. The use of these various hardware and software components is well known to those skilled in the art. Given the relative advances in the state-of-the-art computer systems available today, it is anticipated that the computers used to house data stores 130 and 135 may be made available by employing one of many standard, readily available servers. Depending on the desired size and relative power required to host data stores 130 and 135, storage area network technology may also be deployed in certain preferred embodiments of the present invention.

Data stores 130 and 135 are representative of the type of message stores readily available to most businesses, enterprises, organizations, and, in some cases, individuals. Data stores 130 and 135 may be implemented by employing standard data storage techniques and may comprise relational or other data base models as well as more generalized electronic file storage structures. Data store 130 is representative of a structured data store and data store 135 is representative of an unstructured or semi-structured data store. Data stores 130 and 135 may be used to contain many different types of "messages." For example, database records, electronic drawings, data files, emails, various financial transactions (e.g., check transaction records, a wire transfer between banks, an A/P or A/R entry, etc.), voice messages converted to text, etc. The most preferred embodiments of the present invention will combine or "join" messages from both data store 130 and data store 135 and used the joined dataset to provide various analytical and reporting capabilities to the user of system 100. Additionally, while data stores 130 and 135 are depicted in FIG. 1 as physically separate from each other, those skilled in the art will recognize that data stores 130 and 135 may be hosted on a single computer system and, in certain embodiments, be combined in a single data store.

Computer 170 may be any type of computer system known to those skilled in the art that is capable of being configured for use with system 100 as described herein. This includes laptop computers, desktop computers, tablet computers, pen-based computers and the like. Additionally, handheld and palmtop devices are also specifically included within the description of devices that may be deployed as a computer 170. It should be noted that no specific operating system or hardware platform is excluded and it is anticipated that many different hardware and software platforms may be configured to create computer 170. As previously explained in conjunction with the computer systems used to implement data stores 130 and 135, various hardware components and software components (not shown this FIG.) known to those skilled in the art may be used in conjunction with computer 170.

Network 120 is any suitable computer communication link or communication mechanism, including a hardwired connection, an internal or external bus, a connection for telephone access via a modem or high-speed T1 line, infrared or other wireless communications, private or proprietary local area networks (LANs) and wide area networks (WANs), as well as standard computer network communications over the Internet or an internal network (e.g. "intranet") via a wired or wireless connection, or any other suitable connection between computers and computer components known to those skilled in the art, whether currently known or developed in the future. It should be noted that portions of network 120 may suitably include a dial-up phone connection, broadcast cable transmission line, Digital Subscriber Line (DSL), ISDN line, or similar public utility-like access link.

In the most preferred embodiments of the present invention, network 120 represents and comprises a standard Internet connection between the various components of system 100. Communication link 120 provides for communication between the various components of system 100 and allows for relevant information to be transmitted from device to device. In this fashion, a user can quickly and easily gain access to the relevant data and information utilized to perform the analysis as described in conjunction with the preferred embodiments of the present invention. Regardless of physical nature and topology, network 120 serves to logically link the physical components of system 100 together, regardless of their physical proximity. This is especially important because in many preferred embodiments of the present invention, data stores 130 and 135 and computer 170 will be geographically remote and separated from each other.

While computer 170 is shown as a separate computer system, those skilled in the art will recognize that computer 170 may be combined with data stores 130 and 135 in a single computer system and that the physical location of data stores 130 and 135 may change without affecting the relevancy of the examples presented herein. In the most preferred embodiments of the present invention, computer 170 and data stores 130 and 135 will often be disparate computer systems connected by a local area network. In other embodiments of the present invention, data stores 130 and 135 may be replicated on a mass storage subsystem directly connected to computer 170. Regardless of the specific physical implementation, computer 170 is logically connected to data stores 130 and 135 for the purposes described herein. Finally, it should be noted that while FIG. 1 shows only a single computer 170 connected to network 120, those skilled in the art will recognize that this example merely serves to illustrate the use of computer 170 and that many other computers and computer systems may be similarly deployed in conjunction with system 100 of FIG. 1.

Optional printer 110 and an optional fax machine 140 are standard peripheral devices that may be used in conjunction with system 100 for outputting message transactions, reports, etc. in conjunction with the queries and transactions processed by system 100. Optional printer 110 and an optional fax machine 140 may be directly connected to network 120 or indirectly connected via computer 170 and/or the computers hosting data stores 130 and 135. Finally, it should be noted that optional printer 110 and optional fax machine 140 are merely representative of the many types of peripherals that may be utilized in conjunction with system 100. It is anticipated that other similar peripheral devices will be deployed in the various preferred embodiment of the present invention and no such device is excluded by its omission in FIG. 1.

Figure 2:
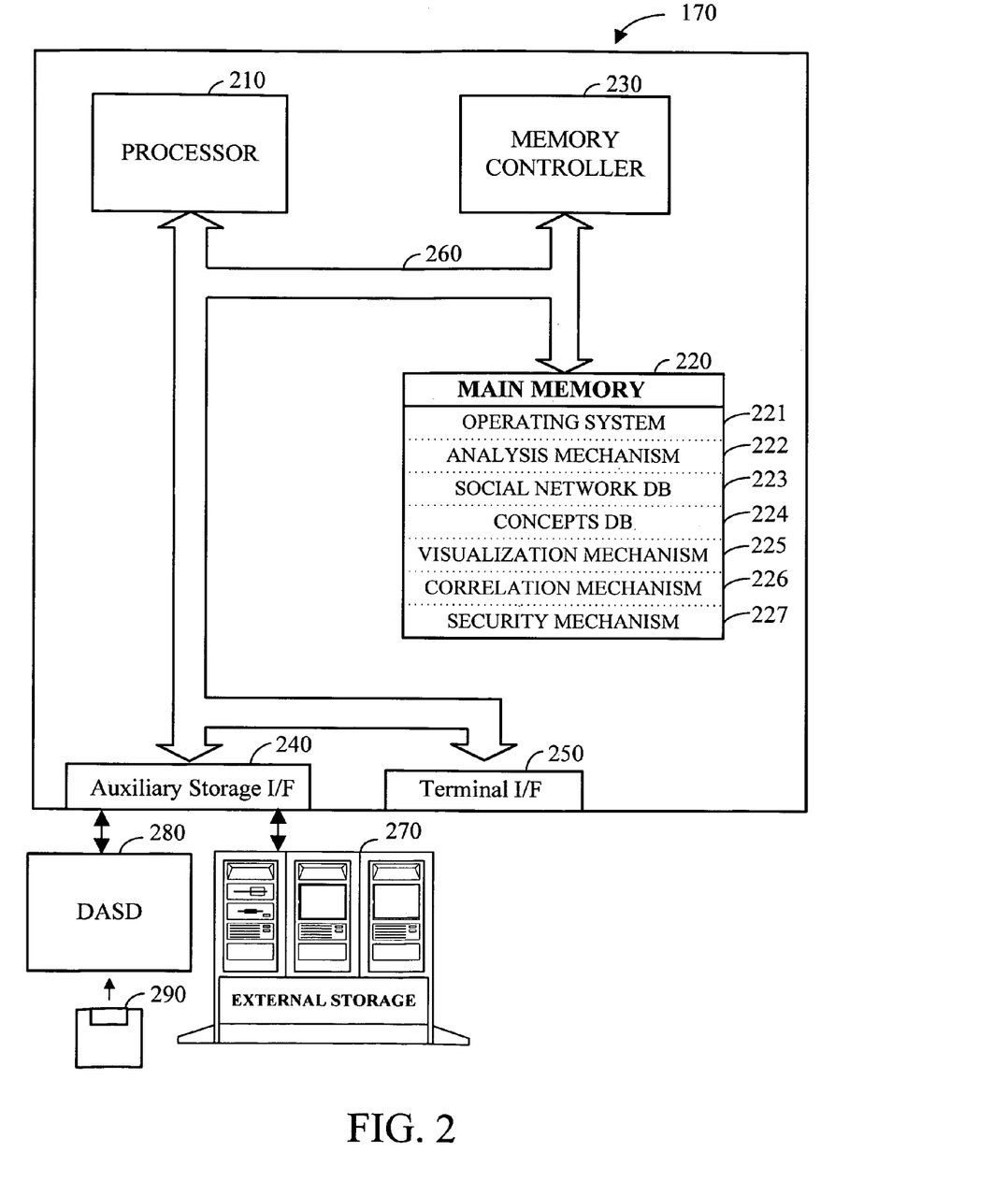
FIG. 2 is a block diagram of the computer used in the computer-based system for correlating, analyzing, and viewing message-centric data based on a social network of FIG. 1.

Referring now to FIG. 2, a computer 170 in accordance with a preferred embodiment of the present invention is any custom or commercially available computer system such as a Linux-based computer system, IBM compatible computer system, Macintosh computer system or the like. Those skilled in the art will appreciate that the methods and apparatus of the present invention apply equally to any computer system, regardless of whether the computer system is a traditional "mainframe" computer, a complicated multi-user computing apparatus or a single user device such as a personal computer or workstation.

Computer system 170 suitably comprises at least one Central Processing Unit (CPU) or processor 210, a main memory 220, a memory controller 230, an auxiliary storage interface 240, and a terminal interface 250, all of which are interconnected via a system bus 260. Note that various modifications, additions, or deletions may be made to computer system 170 illustrated in FIG. 2 within the scope of the present invention such as the addition of cache memory or other peripheral devices. FIG. 2 is not intended to be exhaustive, but is presented to simply illustrate some of the salient features of computer system 170.

Processor 210 performs computation and control functions of computer system 170, and comprises a suitable central processing unit (CPU). Processor 210 may comprise a single integrated circuit, such as a microprocessor, or may comprise any suitable number of integrated circuit devices and/or circuit boards working in cooperation to accomplish the functions of a processor. Processor 210 suitably executes one or more software mechanisms or programs contained within main memory 220. Message stores 130 and 135 may be directly stored in memory 220 or, alternatively, may be coupled to memory 220.

Auxiliary storage interface 240 allows computer 170 to store and retrieve information from auxiliary storage devices, such as external storage 270, magnetic disk drives (e.g., hard disks or floppy diskettes) or optical storage devices (e.g., CD-ROMs, DVDs, etc.). One suitable storage device is a direct access storage device (DASD) 280. As shown in FIG. 2, DASD 280 may be a floppy disk drive that reads programs and/or data from a floppy disk 290.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type or location of signal bearing media used to actually carry out the distribution. Examples of signal bearing media include: recordable type media such as floppy disks (e.g., disk 290) and CD ROMS, and transmission type media such as digital and analog communication links, including wireless communication links.

Memory controller 230, through use of an auxiliary processor (not shown) separate from processor 210, is responsible for moving requested information from main memory 220 and/or through auxiliary storage interface 240 to processor 210. While for the purposes of explanation, memory controller 230 is shown as a separate entity; those skilled in the art understand that, in practice, portions of the function provided by memory controller 230 may actually reside in the circuitry associated with processor 210, main memory 220, and/or auxiliary storage interface 240.

Terminal interface 250 allows users, system administrators and computer programmers to communicate with computer system 170, normally through separate workstations or through stand-alone computer systems such as computer 170 of FIG. 1. Although computer 170 depicted in FIG. 2 contains only a single main processor 210 and a single system bus 260, it should be understood that the present invention applies equally to computer systems having multiple processors and multiple system buses. Similarly, although the system bus 260 of the preferred embodiment is a typical hardwired, multi-drop bus, any connection means that supports bi-directional communication in a computer-related environment could be used to implement the various preferred embodiments of the present invention.

Main memory 220 suitably contains an operating system 221, an analysis mechanism 222, a social network database (DB) 223, a concepts database (DB) 224, a visualization mechanism 225, a correlation mechanism 226, and a security mechanism 227. The term "memory" as used herein refers to any storage location in the virtual memory space of computer 170.

It should be understood that main memory 220 may not necessarily contain all parts of all components shown. For example, portions of operating system 221 may be loaded into an instruction cache (not shown) for processor 210 to execute, while other files may well be stored on magnetic or optical disk storage devices (not shown). In addition, while social network DB 223 and concepts DB 224 are shown to reside in the same memory location as operating system 221, it is to be understood that main memory 220 is a broad representation of memory storage and may consist of multiple disparate memory locations. It should also be noted that any and all of the individual components shown in main memory 220 may be combined in various forms and distributed as a stand-alone program product.

Operating system 221 includes the software that is used to operate and control computer 170 of FIG. 1. In general, processor 210 typically executes operating system 221. Operating system 221 may be a single program or, alternatively, a collection of multiple programs that act in concert to perform the functions of an operating system. Any operating system known to those skilled in the art may be considered for inclusion with the various preferred embodiments of the present invention.

Analysis mechanism 222 is provided to perform analysis on the various messages contained in data stores 130 and 135. Analysis mechanism 222 also provides a user interface that allows a user of computer 170 to model, access, analyze, visualize, and report on the various relationships that exist between the messages contained in data stores 130 and 135 as well as the relationships that exist between the various entities that generated the messages stored in data stores 130 and 135. Analysis mechanism 222 may be used to parse the message header information, message transaction information, and content of the messages stored in data stores 130 and 135 and extract that data for analysis.

For example, analysis mechanism 222 can extract information from the messages stored in data stores 130 and 135 to determine the sender and receiver of each message. This information is then stored in social network DB 223. Similarly, analysis mechanism 222 can extract the concepts contained in the messages stored in data stores 130 and 135 and store these concepts in concepts DB 224. The data regarding the sender and the recipient for each message, combined with the concepts contained in each message, is used to create a social network and relate the concepts to the social network for analysis. Additionally, analysis mechanism 222 may be used to extract the information regarding the time that a message was transmitted from one location to another location. Using the data extracted from and associated with these various messages, analysis mechanism 222 will also coordinate with visualization mechanism 225 to prepare and display graphical representations of the relationships between the concepts, the senders, and the recipients of the various messages stored in data stores 130 and 135.

In general, social network DB 223 is any computer program suitable for creating and/or maintaining a database of information relative to the identities of the various senders and recipients of the messages stored in data stores 130 and 135. This includes custom database programs as well as commercially available "off-the-shelf" database packages provided by software vendors. Preferably, social network DB 223 is a Structured Query Language (SQL) compatible database file capable of storing the data necessary for the implementation of the methodologies described herein. Typically, social network DB 223 will contain the identities and, to the extent available, aliases and other identifying information relative to the various senders and recipients of the messages stored in data stores 130 and 135.

Additionally, in certain preferred embodiments of the present invention, social network DB 223 will also contain message specific meta-data and identity-related data for correlation purposes. This could include additional information such as company or organizational affiliation, address and telephone number, etc. for the senders and recipients of the messages stored in data stores 130 and 135. In conjunction with visualization mechanism 225, the data contained in social network DB 223 is used to create visualizations of the relationships that exist between the various senders and recipients of the messages stored in data stores 130 and 135. While social network DB 223 is shown to be residing in main memory 220, it should be noted that social network DB 223 may be physically located in a location other than main memory 220. For example, social network DB 223 may be stored on external storage device 270 or DASD 280 and coupled to computer 170 via auxiliary storage I/F 240.

Similar to social network DB 223, concepts DB 224 is any computer program suitable for creating and/or maintaining a database of information relative to the storage, analysis and presentation of the information extracted from the messages contained in data store 130 and data store 135. This includes custom database programs as well as commercially available "off-the-shelf" database packages provided by software vendors. Preferably, concepts DB 224 is a Structured Query Language (SQL) compatible database file capable of storing the various concepts contained in the messages extracted data store 130 and data store 135. Additionally, in the most preferred embodiments of the present invention, concepts DB 224 will also contain data that places the concepts in time, relative to the transmission of a given message. While concepts DB 224 is shown to be residing in main memory 220, it should be noted that concepts DB 224 may be physically located in a location other than main memory 220. For example, concepts DB 224 may be stored on external storage device 270 or DASD 280 and coupled to computer 230 via auxiliary storage I/F 240.

It should be noted that, relative to computer 170, social network DB 223 and concepts DB 224 may be stored at a geographically remote location that is accessible via the Internet, by utilizing any suitable Internet file transfer application (XML, SOAP, etc.). In this type of distributed database environment, social network DB 223 and concepts DB 224 may be implemented using various techniques known to those skilled in the art to prevent data redundancy and to ensure data integrity.

Visualization mechanism 225 is used to create graphical representations of the relationships that exist between the senders and receivers of the messages contained in data stores 130 and 135 as well as the relationships that exist between the senders and receivers of the messages and the concepts contained in the messages extracted from data stores 130 and 135. In the most preferred embodiments of the present invention, visualization mechanism 225 uses the information contained in social network DB 223 and concepts DB 224 to create at least the following graphical representations of the social network of communicants: a layered digraph; a force directed graph; a circular layout graph; and a radial view graph. Each of these graphical representations is discussed in greater detail below.

Correlation mechanism 226 is used to identify and correlate various data elements associated with the messages stored in data stores 130 and 135. For example, correlation mechanism 226 can be used to compare and contrast the dates and times associated with the transmission and/or receipt of each message contained in data stores 130 and 135. This allows different messages, which may or may not share common communicants, to be identified and grouped as a function of the day and time the messages were sent and/or received. Additionally, correlation mechanism 226 may be invoked by the operator of computer 170 to identify and correlate the various identities and aliases of the senders and receivers of the messages contained in data stores 130 and 135. Used in conjunction with analysis mechanism 222, social network DB 223, concepts DB 224, and visualization mechanism 225, correlation mechanism 226 can be used to analyze various messages and present graphical representations of the relationships between communicants, messages, and concepts.

While analysis mechanism 222, social network DB 223, concepts DB 224, visualization mechanism 225 and correlation mechanism 226 are all presented as separate elements residing in memory 220, those skilled in the art will recognize that one or more of these elements may be combined with other elements without changing the applicability of the discussion of these elements in relation to the various preferred embodiments of the present invention.

Security mechanism 227 is any known security system or application and represents a security and/or encryption facility for communications and for verifying access to the data contained in and transmitted by computer 170. Additionally, security mechanism 227 may also provide encryption capabilities for the users of computer 170, thereby enhancing the robustness of computer 170. Once again, depending on the type and quantity of information stored in social network DB 223 and concepts DB 224, security mechanism 227 may provide different levels of security and/or encryption for computer 170. Additionally, the level and type of security measures applied by security mechanism 227 may be determined by the nature of a given request and/or response. In certain preferred embodiments of the present invention, security mechanism 227 may be contained in or implemented in conjunction with certain hardware components (not shown this FIG.) such as hardware-based firewalls, switches, dongles, and the like. Additionally, in certain preferred embodiments of the present invention, security mechanism 227 and/or components of security mechanism 227 may be incorporated into operating system 221.

Figure 3:
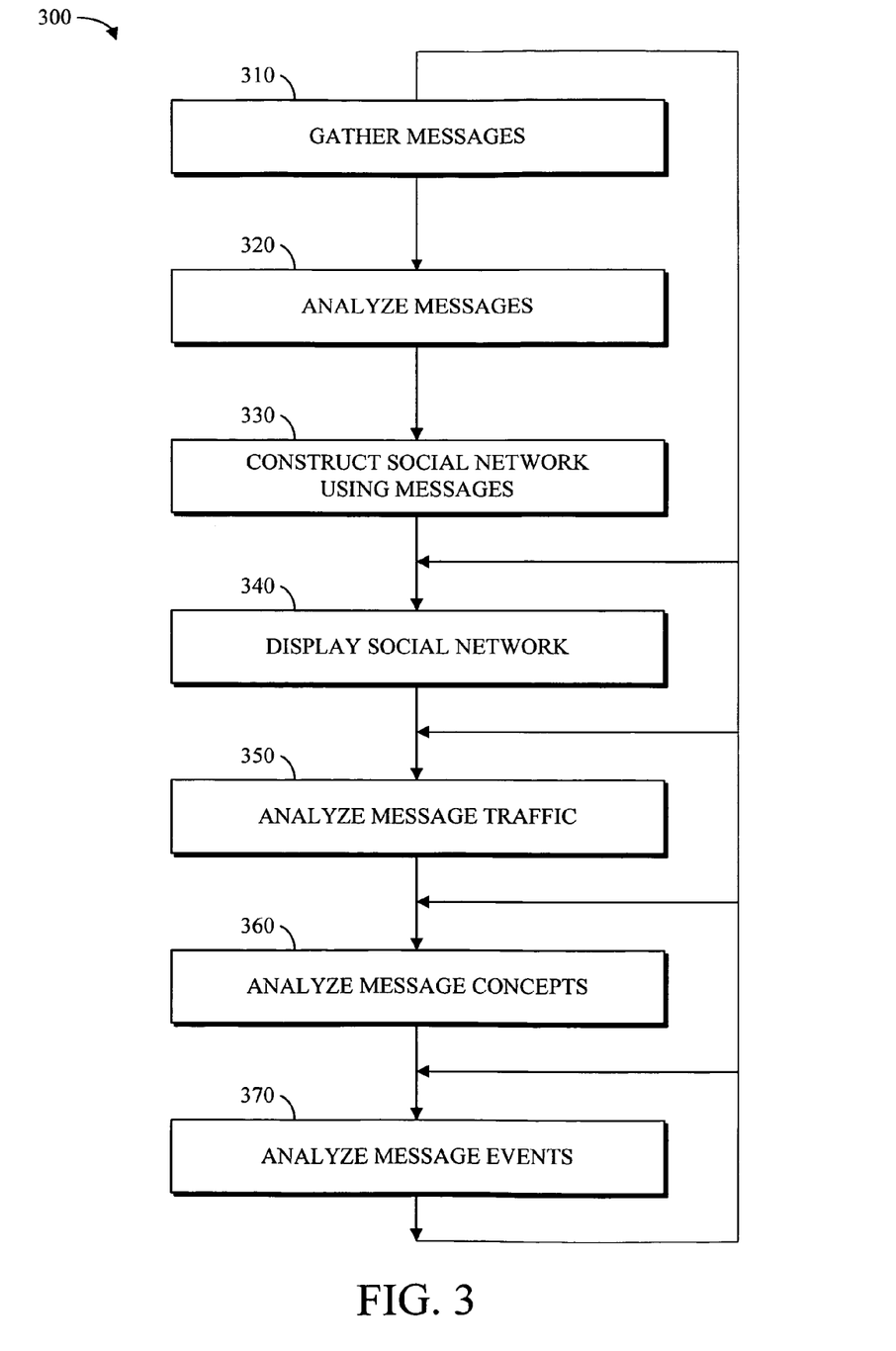
FIG. 3 is a flow chart for a method of correlating, analyzing, and viewing message-centric data based on a social network in accordance with a preferred embodiment of the present invention.

Referring now to FIG. 3, a method 300 for message-centric data analysis and multi-aspect viewing is depicted. First, the messages to be analyzed are identified (step 310). This step may include the selection of a subset of messages from a larger collection as well as the replication and transfer of messages from one data store to another. For example, in certain situations, it may be desirable to preserve the integrity of the original data store for evidentiary purposes. In that case, a research and analysis data store may be created by replicating the original data store and this replicated data store may then be used for analytical purposes. In this fashion, the original data store is essentially undisturbed and kept intact. Additionally, it may be desirable to have the data store relocated to a more convenient location for analytical processing. For example, due to network traffic and security reasons, it may be more convenient to relocate the message to another data store. At some point, the desired messages will be collected and made available for further processing, either in the original data store or some alternative data store.

Next, the individual messages in the data store are analyzed (step 320). This step typically involves deconstructing each individual message to extract various data elements contained in or associated with each message as well as to determine the sender and the recipient for each message. The terms "sender" and "recipient" as used herein may be broadly characterized as individuals and/or entities such as corporations, agencies, etc. Each message in the data store is parsed to determine the sender and receiver and to accumulate the number of messages sent by each sender to each receiver. In the case of email and other similar messages, the person-to-person communications are noted as well as the organization-to-organization communications.

Since information related to the exchanged messages can be stored for individuals as well as companies, it is possible to construct social networks based on corporate level communications as well as individual communications. This allows for broader analysis and additional insight into the flow of messages beyond the initial recipient or recipients. The information relative to sender and receiver is stored in a database and will be used to construct a social network based on message volume and the pattern of communication between the various communicants. Additionally, concepts contained in the messages may be extracted and stored in another database. This stored information may also be used in subsequent visualizations.

It is important to note that the message analysis process will typically involve more than simply identifying which entities are involved in a given message exchange. While identifying the entities exchanging messages is a necessary step in the process, it may not be sufficient for a variety of reasons. For example, in the context of email messages, a single individual may have multiple email addresses. For purposes of constructing an accurate representation of the social network including this individual, it would be desirable to automatically or manually associate or correlate all known related email addresses used by a given entity to that specific entity. Additionally, elements such as date and time each message was sent may also be extracted and stored for use in a chronological or time-based analysis. Finally, the messages may also be analyzed for purposes of removing redundant messages, thereby reducing the possibility of skewing future results and analysis of the messages.

After the messages have been analyzed, it is possible to create a social network (step 330) based on the traffic pattern of the messages that have been exchanged. This process involves creating one or more "links" between the sender and recipient of each message identified in step 310 using the data extracted during step 320. In at least one preferred embodiment of the present invention, one link will be created to represent the message traffic from the first entity to the second entity and a second link will be established to represent the message traffic from the second entity to the first entity. Other embodiments of the present invention will incorporate a single link between each pair of entities to represent the totality of the communication between the entities.

It should be noted that various factors may be included or "weighted" in the construction of the social network in order to more carefully constrain or expand the network, depending on the exact analysis to be performed. For example, the attenuation of communication as well as the nature and number of concepts discussed in the messages can be weighted so as to include or exclude additional entities and/or concepts during the analysis process used to determine the extent of the social network.

Additionally, by including and/or overlaying the concepts of the exchanged messages with the visual representation of the social network, further insights can be gained. For example, once a complete list of concepts has been generated, it may be desirable to exclude certain concepts from the list of concepts. This will, in turn, affect the resultant social network. Further, certain entities may also be considered more or less important than other entities and weighted to further enhance the analysis and control the size and scope of the social network. Finally, concepts that are most germane to the analysis can be more heavily weighted than concepts that are less germane, thereby enhancing the viability of the social network as an analytical tool.

With the social network now created, it is possible to display one or more visual representations of the social network (step 340) that will allow the user of system 100 to gain a more intuitive understanding of the relationship that exists between the entities based on the message exchanges that various entities have had with one another. Typically, each visual representation will be displayed in a "window" on a computer screen and multiple windows may be viewed simultaneously. In addition to the visual representation of the social network, the concepts associated with the messages transmitted and received by the communicants in the social network will also be displayed in another window. The number and complexity of the visual displays and the associated windows is limited only by the robustness of the computer system used to display the visualizations.

In the most preferred embodiments of the present invention, each entity in the social network is represented in the visual representation of the social network as a circular "node" in the network. Further, each node will be supplied with one or more links connecting the represented entity with one or more additional entities, representing the exchange of one or more messages, thereby identifying the entities as communicants for the purposes of message exchange. Additionally, in the most preferred embodiments of the present invention, each link between each pair of nodes will have one or more visual indicators associated with the link to allow for additional insight during analysis. The visual indicators associated with each link can provide a graphical representation characterizing the nature of the message flow between any two entities in the social network.

For example, the physical size of the link may be used to represent the volume of messages exchanged between two entities. In the case of high volume, the link will be wider and where the volume is relatively lower, the link will be narrower. Additionally, a visual indicator in the form of a specific color may be assigned to the link joining each pair of entities. In this case, one color might be used to represent the flow of messages from the first entity to the second entity and a second color may be used to represent the flow of messages from the second entity to the first entity. Additional visual indicators may be used in conjunction with the representation of the entities themselves. For example, with each entity being represented by a node in the visual representation, the size of the nodes can be used to indicate the number of different concepts contained in the various messages sent and/or received by that entity.

In the most preferred embodiments of the present invention, the visual representation of the social network also serves as an interactive user interface, allowing the user to view and analyze various representations of the social network by clicking a pointing device (mouse, stylus, etc.) on one or more elements of the visual representation (nodes, links, etc.). Yet another aspect of the present invention is the ability to simultaneously display multiple versions of the social network and the concepts associated with the messages transmitted by the communicants in the social network. In this fashion, the user can manipulate the visual representation in real time to create multiple views as the relationships between entities and concepts are analyzed.

With the visual representations of the social network and associated concepts now displayed, the user can perform analysis based on the flow of the messages between nodes (social network analysis), message content (semantic network analysis) and/or the relationship that exists between various networks based on when the messages were transmitted, viewed, etc. (event network analysis) (steps 350, 360 and/or 370). These various analyses may be conducted in sequence, in parallel, or simultaneously for all three possible networks (social and/or semantic and/or event).

The visual representation of the combined data underlying the social network and associated message concepts provides referential integrity between the various views of the social network and/or concepts and/or time-based relationship that may be selected by a user. Any component (node or link) of the visual representation is actively linked to the other related components of the visual representation and, if selected, provides an alternative view of the relationships between entities and concepts. This is in contrast to most visualization tools in that most visualization tools simply provide views of the same data from a different perspective or viewpoint (i.e., pie chart or bar graph). With these other known tools, while the graphical representation of the data changes, the data remains the same.

In contrast, the present invention provides multiple different views or visual representations of the related data, based on the focus of the analysis and always based on the underlying relationships between the entities, concepts, and time frame reference associated with the messages exchanged between the entities or communicants. For example, a user could display a semantic network displaying all of the concepts in a given set of messages while simultaneously displaying the social network of the communicants that exchanged the associated messages. Then, by selecting a link connecting any two communicants in the social network, the specific messages that have been sent and or received by these two communicants are highlighted and the list of concepts contained in the relevant messages is presented in the form of a customized list of concepts. The present invention provides a continuous link between the social network and the associated semantic network, based on the actual flow of messages between communicants as represented in the associated data stores.

One of the more valuable visual representations of the present has to do with the chronological relationship of messages exchanged between various communicants in the social network. This visual representation, discussed in conjunction with FIG. 8, recognizes that messages are exchanged over a period of time and that the appearance of the messages in the context of time can provide valuable information.

In the most preferred embodiments of the present invention, the analysis will generally proceed in a recursive fashion, with the user switching between multiple views of the various networks in order to refine the analysis. This process will typically include both filtering certain elements out of the analysis and also filtering or adding certain elements back into the analysis based upon the multi-aspect viewing visualizations performed by the system.

For example, after gathering the messages, the analysis typically starts with constructing and visualizing a social network view of entity relationships based on the messages (e.g., email messages) exchanged between two different companies (i.e., Microsoft and Hewlett-Packard). In this case, the message store can be parsed and the network constructed using the right hand side of the email addresses (i.e., the portion that is after the "@" symbol in the e-mail address). This will provide the raw data for constructing the social network and its related visual representation.

Given this visualization, the number and directional flow of messages (inbound and/or outbound) can be examined, and the four or five most significant relationships can be selected, thereby identifying the person(s) of interest and a new social network can be constructed based on the left hand side of the email address (i.e., the name or identifier that precedes the "@" symbol in the email address). This network would include only the communicants in the two companies that exchanged messages with the targeted individual(s), thereby filtering out non-representative messages. Next, the concepts contained in the messages exchanged between these targeted individuals (semantic network) can be visualized. By identifying specific concepts of interest (filtering) for the given analysis, the network may be further reduced. At this point, if desired, the exchange of messages between the selected individuals can be expanded by extracting messages from the data store that the targeted individuals exchanged with third parties not directly related to the original companies. This effectively adds data to the various networks and corresponding visualizations or "filters in" additional data points for reference and analysis.

Finally, the message events can be viewed based on their chronological relationship to each other. It is important to note that any given analysis may include all of these types of visualization and the user may view some or all of these visualization simultaneously. Additionally, any user-initiated change in the social network is immediately reflected in the semantic network and the event network (and associated visualizations). Similarly, any user-initiated change in the semantic network is immediately reflected in the social network and the event network and so on. Those skilled in the art will recognize that this specific example can be easily modified and adapted for other situations to include almost any type of message exchanged between any number of individuals and/or entities.

Figure 4:
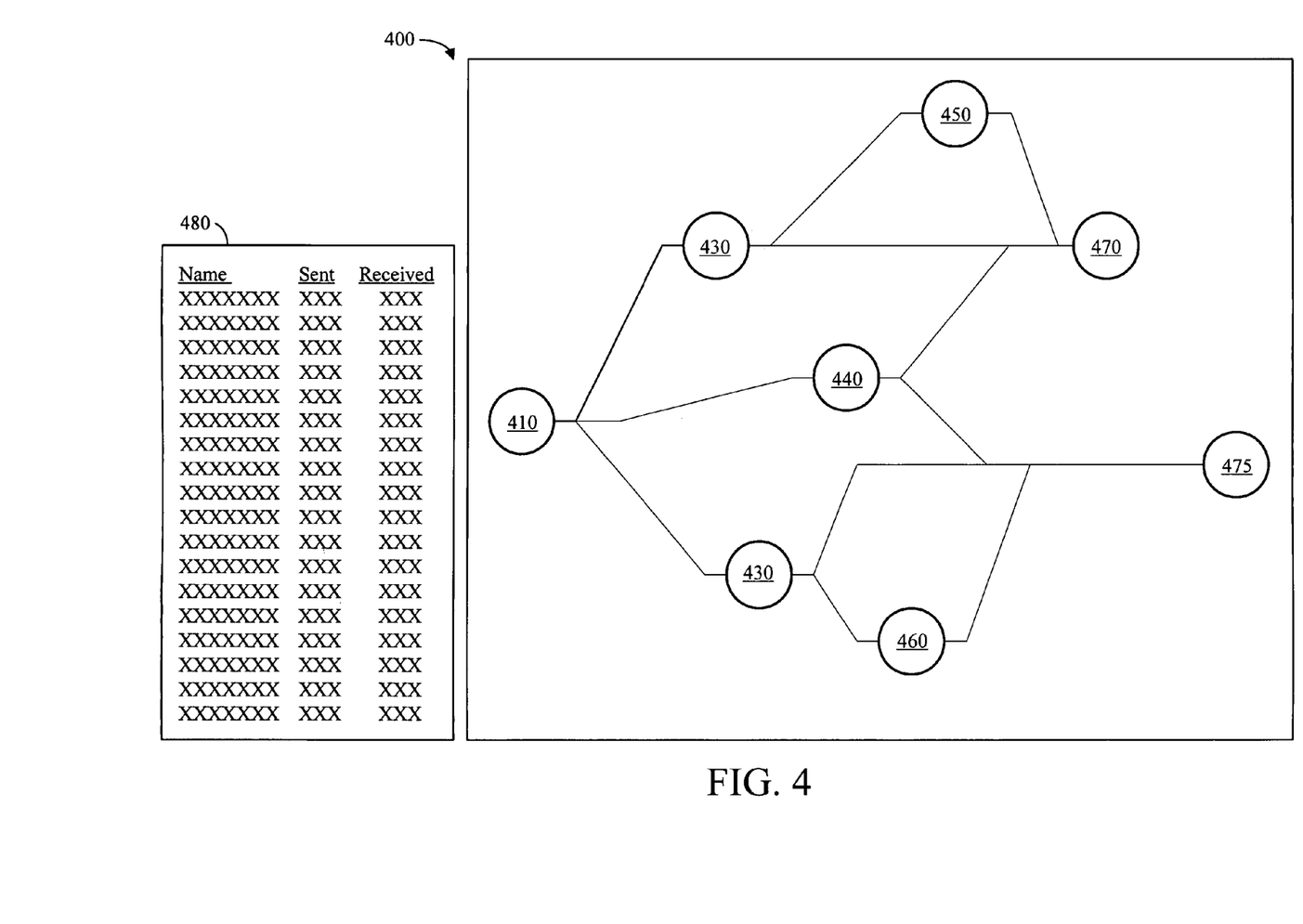
FIG. 4 is a layered digraph representing a visualization of a social network and related concepts created in accordance with a preferred embodiment of the present invention.

Referring now to FIG. 4, a layered digraph 400 representing a visualization of a social network and related message concepts in accordance with a preferred embodiment of the present invention is depicted. Layered digraph 400 is a Gantt chart-type representation that shows the social network based on messages between communicants and also presents a chronological view of when the various communicants exchanged the messages. Nodes 410-475 represent various entities that have exchanged messages with one another. In the most preferred embodiments of the present invention, nodes 410-475 are positioned from left to right and top to bottom by a predetermined sequence. The ordering can be, for example, chronologically from left to right with the most relevant concepts layered either top to bottom or from the center out, depending on the user's preference. Additionally, table 480 is constructed to provide a tabular or list view of certain data related to the visual representation displayed in graph 400. Table 480 may include a variety of information including a list of entities along with the number of messages sent and/or received. Additionally, table 480 may contain a list of concepts contained in the messages displayed in graph 400. The use of table 480 provides additional analytical opportunities that are not typically available absent the use of table 480.

Figure 5:
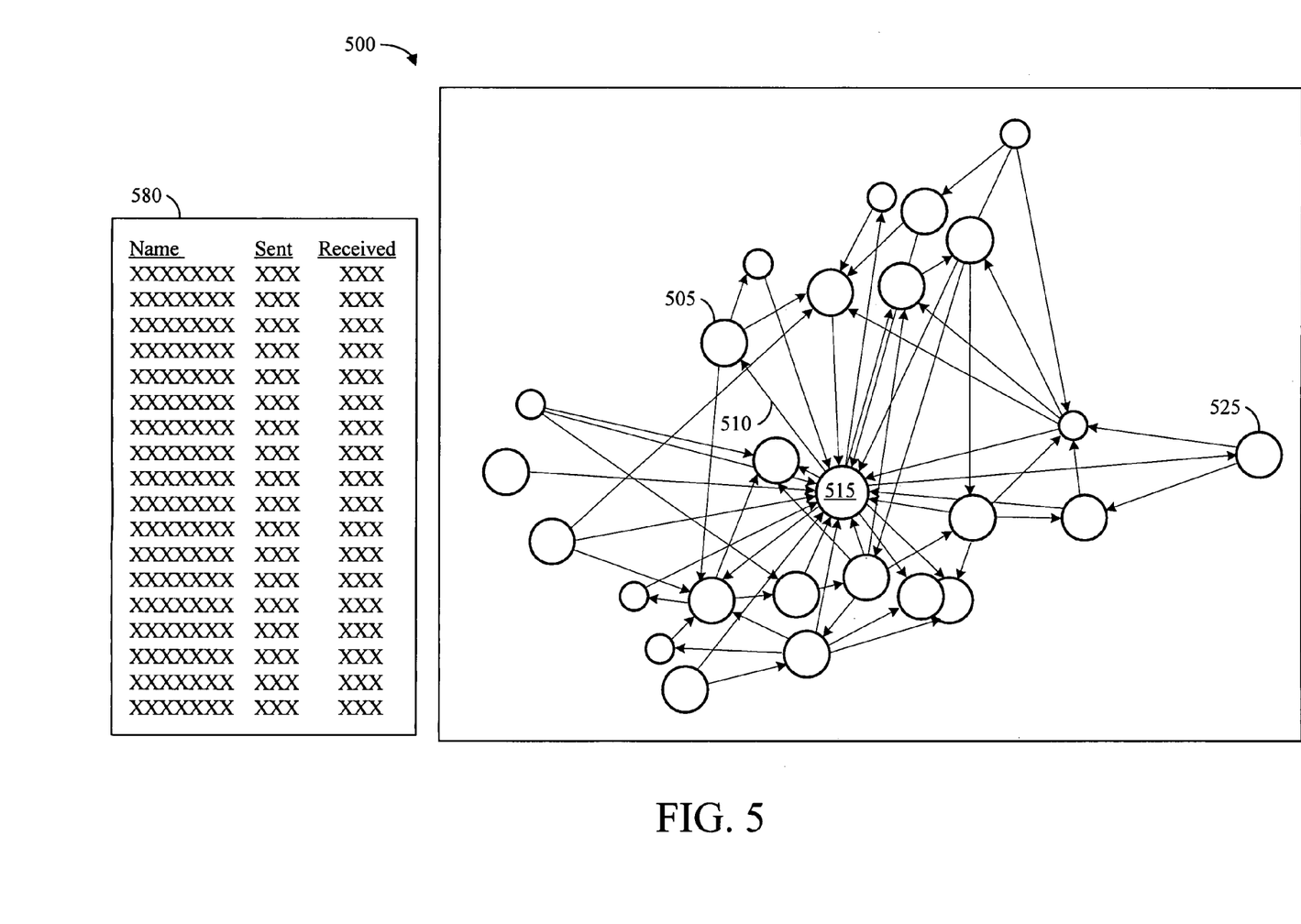
FIG. 5 is a force directed graph representing a visualization of a social network and related concepts created in accordance with a preferred embodiment of the present invention.

Referring now to FIG. 5, a force directed graph 500 representing a visualization of a social network and related message concepts in accordance with a preferred embodiment of the present invention is depicted. In force directed graph 500, each node is positioned positively or negatively, relative to the selected node (i.e., closer to the selected node or further from the selected node), based on a combination of different forces. For example, all individuals employed by a given organization may be assigned a positive attraction factor to move those nodes closer to the selected node as compared to individuals employed by a third party. Similarly, certain concepts may be assigned a positive attraction factor, thereby moving those nodes representing message exchanges relative to the selected concepts closer to the selected node. Those skilled in the art will recognize that other similar factors could also be used to positively or negatively adjust the position of various nodes relative to the selected node.

In the case of FIG. 5, node 515 is the selected node and, based on the selected weighting factors, node 505 has been positioned closer to node 515 than node 525, representing that fact that the weighting factors presently associated with the entity analysis (entity relationship, physical proximity, etc.) and/or the messages exchanged between the entities (message concepts, date of messages, etc.) represented by node 515 and 505 are more relevant to the entity analysis than the entities and/or the messages exchanged between the entities represented by node 515 and node 525.

In the most preferred embodiments of the present invention, graph 500 will also include optional table 580. Table 580 is constructed to provide a tabular or list view of certain data related to the visual representation displayed in graph 500. Table 580 may include a variety of information including a list of entities along with the number of messages sent and/or received. Additionally, table 580 may contain a list of concepts contained in the messages displayed in graph 500. The use of table 580 provides additional analytical opportunities that are not typically available absent the use of table 580.

For example, by selecting an entity or a concept from the list presented in table 580, certain nodes displayed in graph 500 will be highlighted, based on the nodes in graph 500 that are associated with the entity or concepts selected. Alternatively, clicking on a given node in graph 500 will cause certain concepts or entities will be highlighted in table 580.

Figure 6:
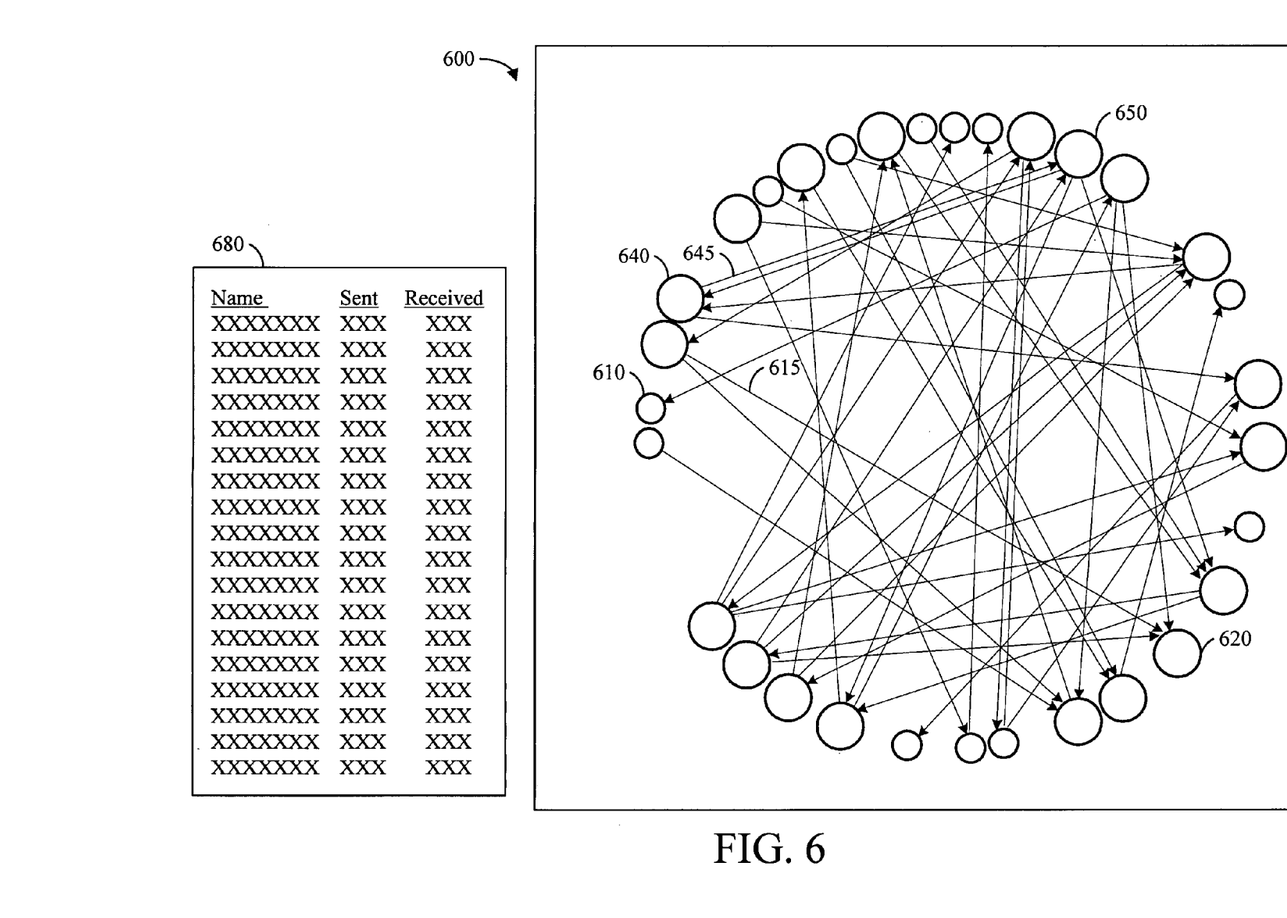
FIG. 6 is a circular layout graph representing a visualization of a social network and related concepts created in accordance with a preferred embodiment of the present invention.

Referring now to FIG. 6, a circular layout graph 600 representing a visualization of a social network and related message concepts in accordance with a preferred embodiment of the present invention is depicted. Nodes 610, 620, 640, and 650 represent entities and each of link or arrow 615 and 645 represent the exchange of a message between entities. In the most preferred embodiments of the present invention, nodes 610-650 are ordered sequentially or chronologically in time, in a clockwise fashion from the 12:00 position moving around the circle, based on the date of the earliest exchanged message for the search criteria of interest. Those skilled in the art will recognize that other configurations are possible. This representation presents a visualization of the message traffic, based on the number of links coming in and out of a given node. For example, in FIG. 6, node 640 has substantially more links than node 610, representing a higher volume of message traffic. Additionally, with an interactive graphical user interface, the user may, by clicking or hovering over any element of graph 600, additional information such as entity name, date of messages, concepts, etc. may be displayed. Additionally, table 680 is constructed to provide a tabular or list view of certain data related to the visual representation displayed in graph 600. Table 680 may include a variety of information including a list of entities along with the number of messages sent and/or received. Additionally, table 680 may contain a list of concepts contained in the messages displayed in graph 600. The use of table 680 provides additional analytical opportunities that are not typically available absent the use of table 680.

Figure 7:
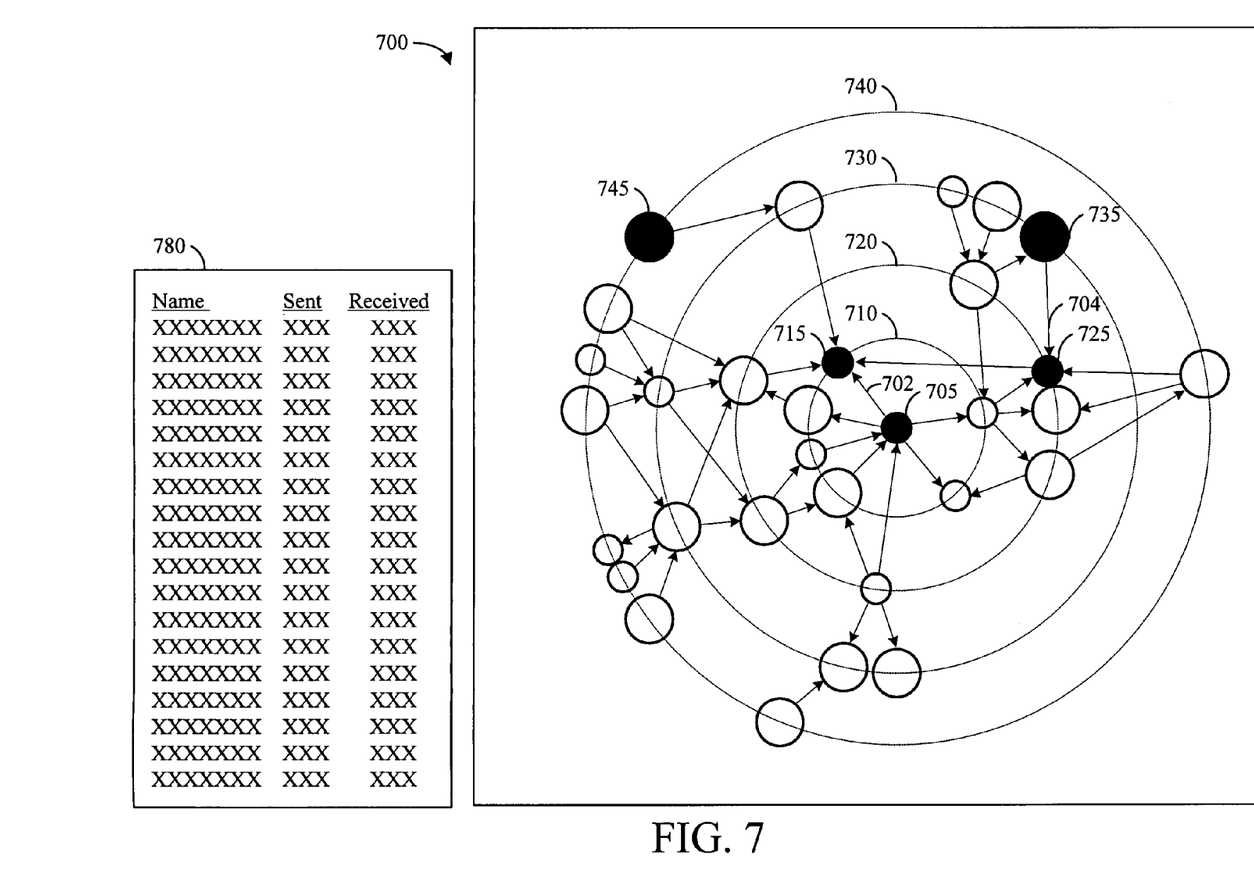
FIG. 7 is a radial view graph representing a visualization of a social network and related concepts created in accordance with a preferred embodiment of the present invention.

Referring now to FIG. 7, a radial view graph 700 representing a visualization of a social network and related message concepts in accordance with a preferred embodiment of the present invention is depicted. Radial view graph 700 positions each node based on its relationship to the central node. The position of the nodes relative to the central node can be characterized as "degrees of separation." For any node that has a direct message exchange with the central node, the degree of separation is "2." For each node that has a message exchange with a node that has a direct message exchange with the central node, the degree of separation is "3." In the case of graph 700, there are five degrees of separation, represented by the center point of graph 700 (represented by document or entity 705), and circles 710, 720, 730, and 740.

For example, all of the nodes shown on circle 710 represent all of the messages (or, in an alternative view, entities) with a degree of separation of "2," relative to messages or entity 705. Similarly, the nodes shown on circle 720 represent all of the messages or entities with a degree of separation of "3," relative to document or entity 705. In the same fashion, circles 730 and 740 represent those messages or entities with a degree of separation of "4" and "5" respectively. In general, the visual representation of graph 700 can be used to track which entities are in communication with each other as well as to track the flow of messages outside of the immediate influence of the entity that originated the message. While the degree of separation nomenclature adopted herein is fairly typical, the actual number of degrees of separation may vary, depending on the specific nomenclature adopted. Those skilled in the art will recognize that the actual degree of separation remains the same, regardless of the specific nomenclature adopted.

In the most preferred embodiments of the present invention, graph 700 will also include optional table 780. Table 780 is constructed to provide a tabular or list view of certain data related to the visual representation displayed in graph 700. Table 780 may include a variety of information including a list of entities along with the number of messages sent and/or received. Additionally, table 780 may contain a list of concepts contained in the messages displayed in graph 700. The use of table 780 provides additional analytical opportunities that are not typically available absent the use of table 780.

For example, by selecting a name or a concept from the list presented in table 780, certain nodes displayed in graph 700 will be highlighted. In the case of graph 700, nodes 705, 715, 725, 735, and 745 have been highlighted based on the selection of a message concept or selection of a given entity, either directly from table 780 or from an alternative visual representation such as those displayed in FIGS. 4-8. By virtue of their highlighted status, these nodes are identified as being representative of the concepts or entities of interest for analytical purposes. By clicking on the individual nodes, additional information regarding the identity of the communicants as well as the number of messages, etc. can be viewed. The other nodes in FIG. 7 are not highlighted and, therefore, are not related to the currently selected concepts or entities of interest. Alternatively, by clicking on a link such as link 702 or 704, the concepts contained in the messages exchanged by the entities connected by those links will be highlighted in the list or tabular presentation contained in table 780.

The primary purpose of graph 700 is to graphically illustrate the nature and attenuation of the relationship for the various concepts contained in the message or messages that have been exchanged by the various entities or communicants. By analyzing the relationship of the communicants, the concepts contained in the messages, as well as the degree of attenuation for the messages, specific decision-making processes can take place.

Figure 8:
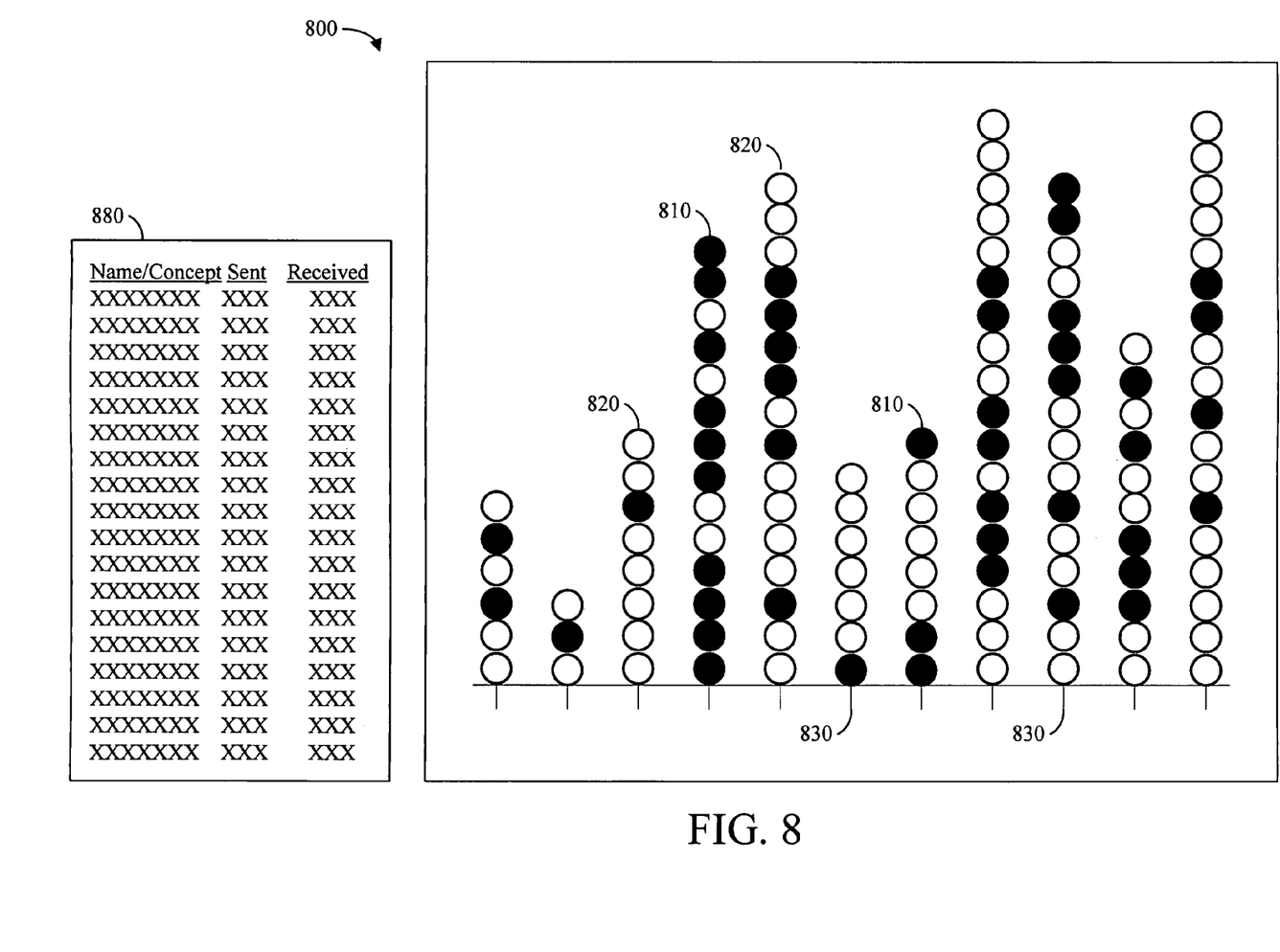
FIG. 8 is a time view graph representing a visualization of the chronological relationship of exchanged messages in a social network and related concepts from those exchanged messages created in accordance with a preferred embodiment of the present invention.

Referring now to FIG. 8, a time view graph 800 representing a visualization of the chronological relationship of exchanged messages in a social network and related concepts from those exchanged messages created in accordance with a preferred embodiment of the present invention is depicted. Graph 800 graphically depicts the two-dimensional nature of the messages exchanged between the entities or communicants in a given social network relative to the passage of time.

In the most preferred embodiments of the present invention, graph 800 will also include optional table 880. Table 880 is constructed to provide a tabular or list view of certain data related to the visual representation displayed in graph 800. Table 880 may include a variety of information including a list of entities along with the number of messages sent and/or received. Additionally, table 880 may contain a list of concepts contained in the messages displayed in graph 800. The use of table 880 provides additional analytical opportunities that are not typically available absent the use of table 880.

For example, by selecting a name or a concept from the list presented in table 880, certain nodes displayed in graph 800 will be highlighted. In the case of graph 800, nodes 810 have been highlighted based on the selection of a message concept or selection of a given entity, either directly from table 880 or from an alternative visual representation such as those displayed in FIGS. 4-8. By virtue of their highlighted status, nodes 810 are identified as being messages representative of the concepts or entities of interest for analytical purposes. Nodes 820 are not highlighted and, therefore, are not related to the currently selected concepts or entities of interest.

Additionally, by grouping and displaying the nodes in chronological order, further analytical insight can be gained. In the case of graph 800, each grouping 830 is representative of a given time period. Depending on the level of detail desired, each grouping 830 may be representative of a given minute, day, week, month, etc. with all messages associated with that specific grouping 830 being grouped together in a vertical column. By noticing the occurrence of the grouping of various nodes over time, the concepts associated with the messages as well as the flow of the messages over time can be analyzed. This allows for the analysis of the message traffic in two dimensions, horizontally and vertically. The horizontal aspect shows the relationship of a given message or messages in relation to the general passage of time whereas the vertical aspect shows the relationship of multiple messages to each other.

Figure 9:
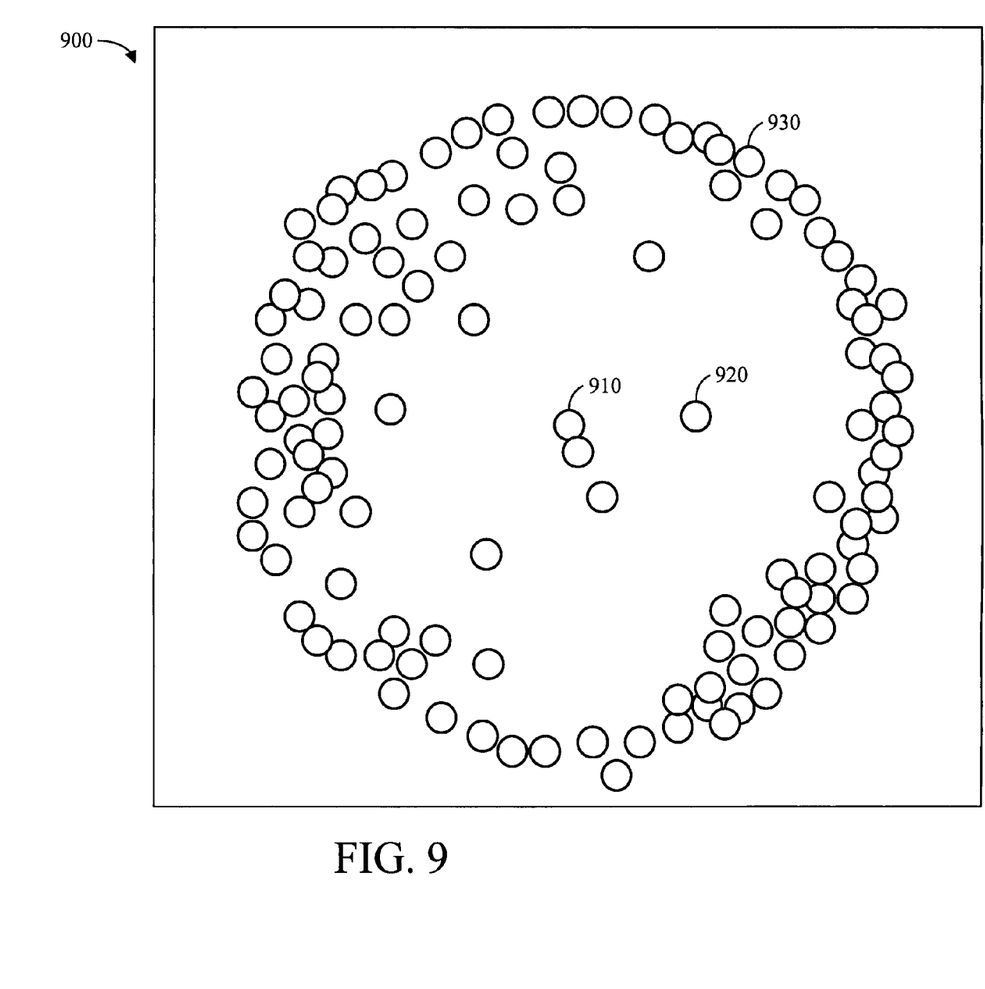
FIG. 9 is a message universe graph representing a visualization of the semantic relationship between various messages exchanged between the entities in a social network created in accordance with a preferred embodiment of the present invention

Referring now to FIG. 9, a message galaxy graph 900 representing a visualization of a social network and related messages exchanged between the various entities in a social network created in accordance with a preferred embodiment of the present invention is depicted. In graph 900, each node represents a given message identified as being exchanged between various entities, based upon the previously constructed social network. In graph 900, a particular message of interest 910 is identified. Then, message of interest 910 is automatically positioned in the center of graph 900 and the remaining messages associated with the previously identified social network are then spaced around message of interest 910 with the distance between the various nodes being based on their relations to the concepts in message of interest 910 and/or their relationship with the entity associated with the various messages. In the case of the node representing message of interest 910, the node representing message 920 is located "closer" to the node representing message of interest 910 than is the node representing message 930. This visual representation provides information about the relevance of the various messages with message 920 being more relevant than message 930.

Referring now to FIGS. 4-9, the common characteristics of the various visual representations of the relationship between the entities and associated messages exchanged by the entities can be further analyzed and explained. For each of graphs 400-700, each node in the graph represents a specific entity and each link between nodes is representative of the messages exchanged between the communicants. Each node and link between any two nodes is connected to a concepts database and a social network database. By selecting a link or a node in a given visual representation, a list of all concepts associated with that entity or link between entities can be displayed.

In graphs 800 and 900, each node represents a given message exchanged by and between the entities in the social network. Each of the elements depicted in graphs 400-900 are also capable of displaying "rollover" information. This means that whenever a user places a visual indicator, such as a mouse pointer, crosshair, or the like over any element of the graph, the visualization of the social network and the messages displayed in conjunction with the visualization of the social network will display additional information for the selected element. For example, hovering over a node that represents a message will generate the display of the date of the message, the major concepts contained in the message, and the entities involved in the exchange of the message. Similarly, hovering over a link that connects two nodes will generate similar information regarding the exchanged message or the entities involved in the exchange of the message.

Additionally, it should be noted that each and/or all of the views discussed in conjunction with FIGS. 4-9 may be displayed simultaneously, in any desired combination. Further, by clicking on any link in any visual representation, additional information relative to the messages represented by that specific link (list of concepts, number of messages exchanged between communicants/entities, etc.) may be displayed and analyzed. Additionally, the electronic versions of the messages themselves may be selected and displayed, if desired.

Using the apparatus and methods of the present invention as described herein, it is possible to identify, examine, and analyze which entities are communicating with other entities, when they are communicating with the other entities, and what the various entities are communicating about. This type of analysis is not possible with other presently known tools and, accordingly, presents a significant advance in the field of data analysis, particularly with respect to social network analysis. Those skilled in the art will appreciate that much of the power of the present invention comes from the ability to display and analyze multiple views of the entities, messages, concepts, and relationships simultaneously.

From the foregoing description, it should be appreciated that apparatus and method of the present invention provides significant benefits that would be apparent to one skilled in the art. It is also important to note that although the present invention has been described herein in the context of certain representative message types, the various preferred embodiments of the invention are not limited to the specific message types used in any single example. Each of the various preferred embodiments of the present invention are equally applicable to other similar environments such as computer-based reservation systems for on-line meetings, blog entries posted on the Internet, chat room messages, instant messaging communications, and the like. Furthermore, while a limited number of preferred embodiments have been presented in the foregoing description for the purposes of illustration and explanation, it should be appreciated that a vast number of variations in the embodiments exist.

Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing one or more preferred exemplary embodiments of the invention, it being understood that various changes may be made in the function and arrangement of elements described in the exemplary preferred embodiment without departing from the spirit and scope of the invention as set forth in the appended claims.

The invention claimed is:

1. A method comprising the steps of:
analyzing a plurality of exchanged messages by an analysis mechanism residing in a memory coupled to at least one processor;
constructing a social network based on said plurality of exchanged messages;
extracting a plurality of concepts from said plurality of exchanged messages based on said social network;
creating a semantic network from said plurality of concepts;
displaying a visual representation of said social network on a monitor, thereby creating a social network visualization said step of displaying a visual representation of said social network on a monitor comprising the step of displaying at least two of:
a layered digraph representing said social network;
a force directed graph representing said social network;
a circular layout graph representing said social network;
a radial view graph representing said social network; and
a time based message graph, said time based message graph comprising a plurality of nodes, wherein each node represents a message exchanged between at least two entities; and
displaying said plurality of concepts on said monitor in concert with said social network visualization.

2. The method of claim 1 wherein said visual representation comprises a plurality of nodes and a plurality of links, with each of said plurality of links linking at least two of said plurality of nodes, thereby creating at least one pair of linked nodes wherein each of said pair of linked nodes represents at least one message exchange between two entities.

3. The method of claim 1 wherein said plurality of nodes are visually positioned to convey a visual representation of date and/or time-related information for each of said plurality of nodes relative to each of the other said plurality of nodes.

4. The method of claim 1 wherein each of said plurality of links and said plurality of nodes is linked to a concepts database and further comprising the step of activating a link or node by clicking on said link or node, thereby extracting and displaying at least one concept from said concepts database.

5. The method of claim 3 wherein at least one pair of linked nodes is linked by at least one of said plurality of links, said at least one of said plurality of links further comprising at least one visual indicator, said at least one visual indicator providing a graphical representation characterizing the nature of at least one message exchanged between said entities represented by said linked nodes.

6. The method of claim 5 wherein said at least one visual indicator comprises a color.

7. The method of claim 5 wherein said at least one visual indicator represents the volume of messages exchanged between said entities represented by said linked nodes and/or the directional flow of the messages exchanged between said entities represented by said linked nodes.

8. The method of claim 1 further comprising the step of displaying additional information by positioning a cursor over an element of said visual representation of said social network.

* * * * *